Aug. 12, 1924.
A. KLUG
AUTOMOBILE BUMPER
Filed Jan. 30, 1924
1,505,033
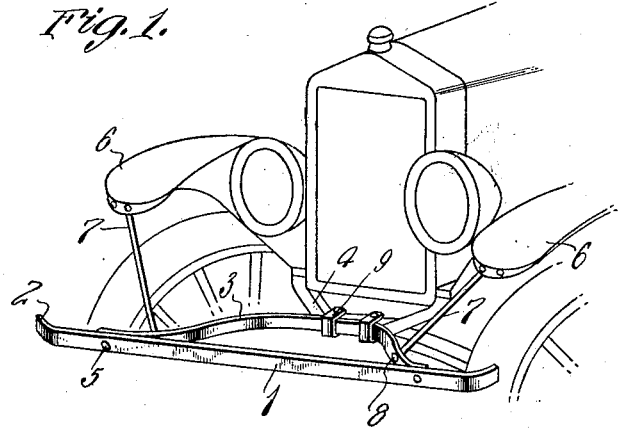
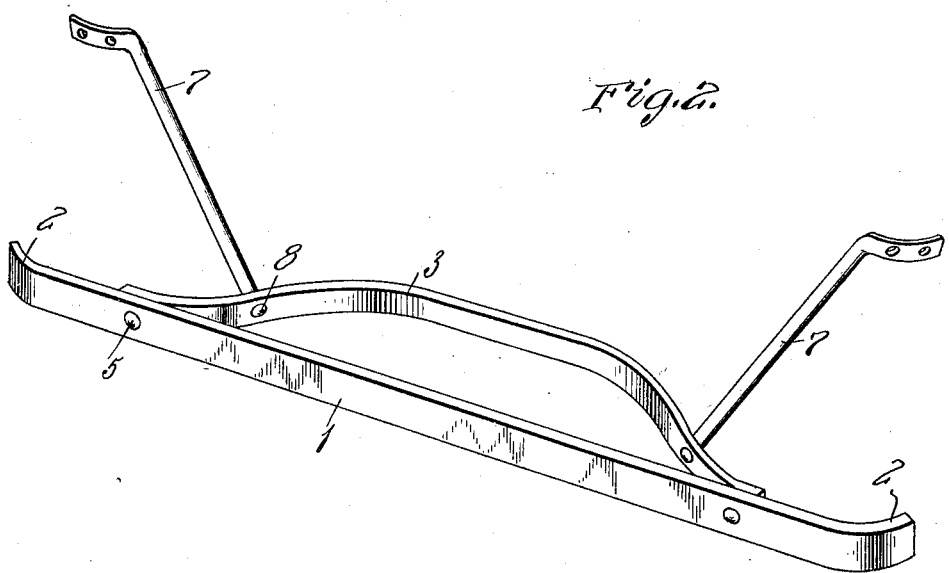
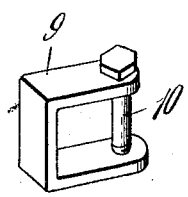
Albert Klug
INVENTOR
BY Victor J. Evans
ATTORNEY Patented Aug. 12, 1924.

1,505,033

UNITED STATES PATENT OFFICE.

ALBERT KLUG, OF COLUMBUS, NEBRASKA.

AUTOMOBILE BUMPER.

Application filed January 30, 1924. Serial No. 689,538.

*To all whom it may concern:*

Be it known that I, ALBERT KLUG, a citizen of the United States, residing at Columbus, in the county of Platte and State of Nebraska, have invented new and useful Improvements in Automobile Bumpers, of which the following is a specification.

The object of my said invention is the provision of an automobile bumper that is, at once, susceptible of ready installation, light in weight and inexpensive in construction and efficient in use.

To the attainment of the foregoing, the invention consists in the improvement as hereinafter described and definitely claimed.

In the accompanying drawings, forming part of this specification:—

Figure 1 is a perspective of a portion of an automobile showing a front bumper constructed in accordance with my invention and carried by the automobile.

Figure 2 is an enlarged perspective of the bumper and its appurtenances.

Figure 3 is an enlarged perspective showing one of the clamps employed in the attachment of the bumper.

Similar numerals of reference designate corresponding parts in all of the views of the drawings.

Among other elements my novel bumper comprises a transverse bar 1, preferably of steel and provided with curvilinear laterally deflected end portions 2. The said bar 1 is preferably formed of steel in accordance with prevailing practice.

In addition to the bar 1 which is straight throughout the greater part of its length and intermediate of the end portions 2, my novel bumper comprises a bowed spring bar 3, also preferably of steel, and designed to rest in interposed relation between the bar 1 and the opposed portion of the automobile frame 4, it being understood that the frame portion 4 is an end frame portion, and that the bar 1 is spaced therefrom in a parallel plane. The end portions of the bowed spring bar 3 are straight as best shown in Figure 2, and each end portion is connected by rivets 5 to the transverse straight bar 1.

The front fenders of the automobile are designated by 6, and it will be understood that the bumper includes rods 7, preferably of iron, which are connected to the fenders 6 in appropriate manner and are also connected to the bowed spring bar 3, the latter connections being designated by 8 and being located at intermediate points in the length of the bowed spring bar 3 though adjacent to the transverse bar 1 as illustrated.

At a point adjacent to its center the bowed spring bar 3 is connected to the end portion of the automobile frame or chassis 4 by clamps 9. The said clamps 9 straddle the bar 3 and the opposed portion of the frame 4, and are secured on the said frame portion by bolts 10 so that the bowed spring bar 3 is strongly held to and against the frame portion 4.

In the practical use of my novel bumper, the bowed spring bar 3 will manifestly serve to efficiently cushion the bar 1 when the latter is subjected to a blow, and will prevent the transmission of the shock to the automobile proper and will preclude injury to the automobile proper including the fenders 6. It will also be manifest that the rods 7 will assist in the attachment of the bumper in proper working relation and at the same time will brace the fenders 6 so as to prevent distortion of the fenders 6 in case of collision.

With slight immaterial modifications my novel bumper is designed to be used to advantage at the rear end of an automobile, but I have deemed it unnecessary to illustrate the application of the bumper to the rear end of an automobile.

It will be apparent from the foregoing that my novel bumper is simple and inexpensive in construction and light in weight and efficient in operation, and that it is adapted to be quickly and easily applied to automobiles of all kinds.

Obviously the weight of the parts embodied in the bumper may be varied in accordance with the weight of the automobile to which the bumper is to be applied.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. An automobile bumper comprising a transverse bar with deflected end portions, a bowed spring bar connected at its ends with the transverse bar and curved away from the same and adapted to be connected adjacent to its center to an opposed end portion of an automobile chassis or frame, and connections on the bowed spring bar at intermediate points in the length thereof and adapted for connection to fenders.

2. An automobile bumper comprising a transverse bar with deflected end portions, a bowed spring bar connected at its ends with the transverse bar and curved away from the same and adapted to be connected adjacent to its center to an opposed end portion of an automobile chassis or frame, and connections on the bowed spring bar at intermediate points in the length thereof and adapted for connection to fenders; the said connections being in the form of rods connected to and extending laterally from the bowed spring bar.

3. The combination with an automobile frame and fenders, of a bowed spring bar arranged with its convex side opposed and connected to an end portion of the frame, a transverse bar opposed to the concave side of the bowed spring bar and connected to the end portions of said bar, and rods interposed between the end portions of the bowed spring bar and the adjacent fenders.

4. The combination with an automobile frame and fenders, of a bowed spring bar arranged with its convex side opposed and connected to an end portion of the frame, a transverse bar opposed to the concave side of the bowed spring bar and connected to the end portions of said bar, and rods interposed between the end portions of the bowed spring bar and the adjacent fenders; the connection of the bowed spring bar to the end portion of the frame being effected by clamps having bodies straddling the bowed spring bar and a frame portion, and bolts securing said bodies in position.

In testimony whereof I affix my signature.

ALBERT KLUG.